July 15, 1969     T. L. SHERBERT ET AL     3,455,597

PASSENGER VEHICLES

Filed July 20, 1967     3 Sheets-Sheet 1

INVENTORS
THOMAS L. SHERBERT
TILLISON M. SHERBERT

BY Browne, Schuyler & Beveridge

ATTORNEYS

July 15, 1969     T. L. SHERBERT ET AL     3,455,597
PASSENGER VEHICLES
Filed July 20, 1967     3 Sheets-Sheet 2
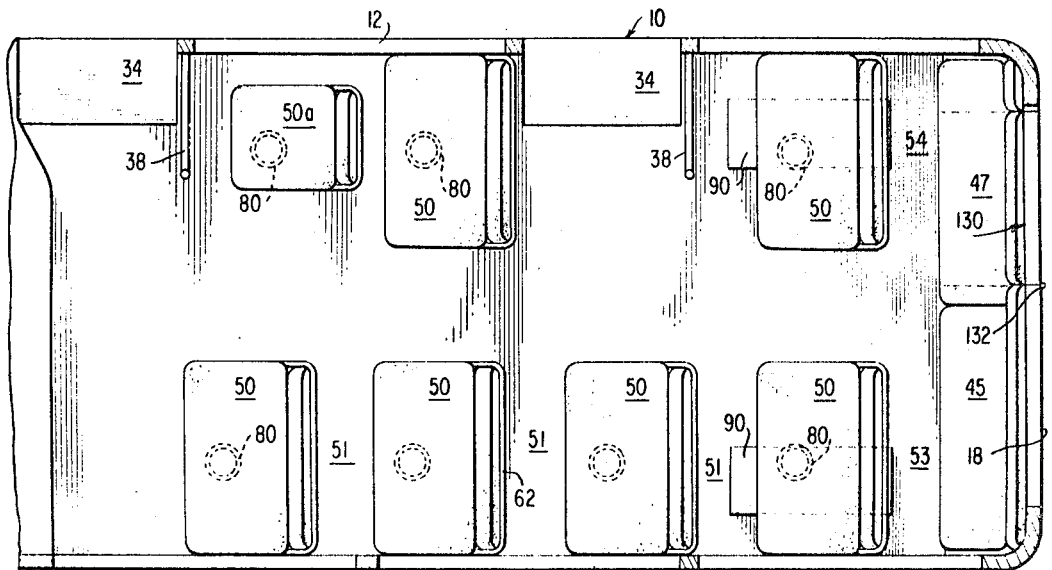
FIG. 3
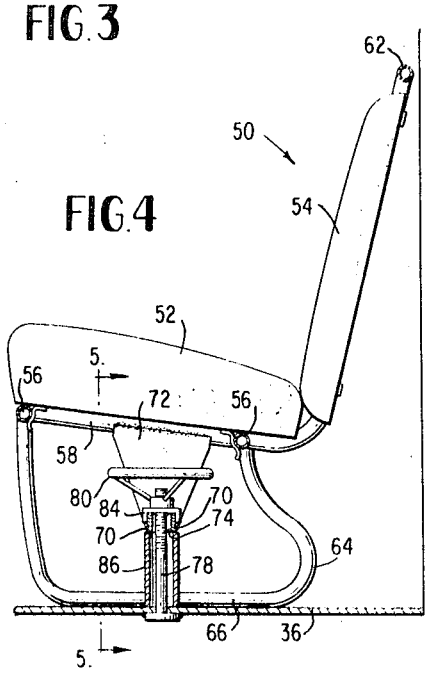
FIG. 4
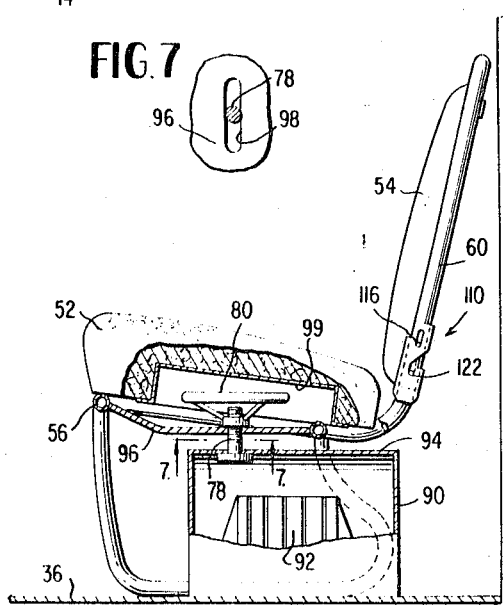
FIG. 7
FIG. 6
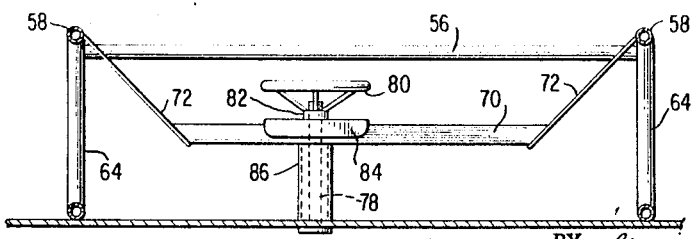
FIG. 5
INVENTORS
THOMAS L. SHERBERT
TILLISON M. SHERBERT
BY Browne, Schuyler & Beveridge
ATTORNEYS July 15, 1969   T. L. SHERBERT ET AL   3,455,597
PASSENGER VEHICLES
Filed July 20, 1967   3 Sheets-Sheet 3
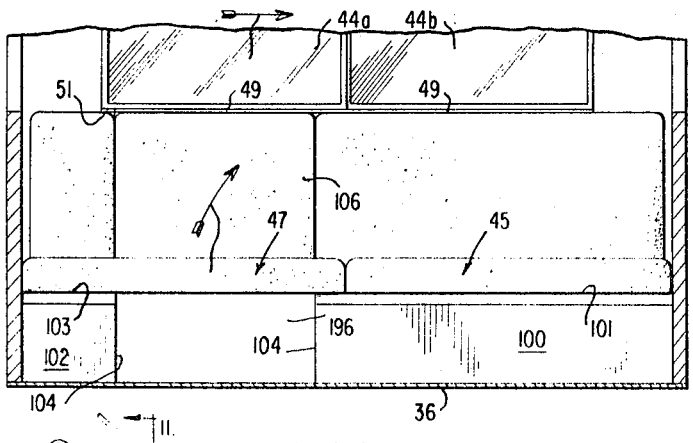
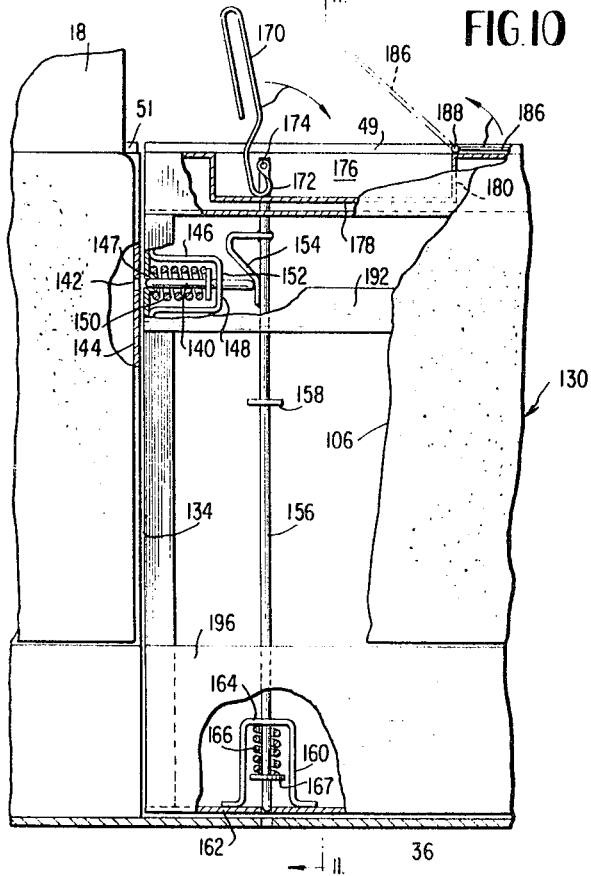
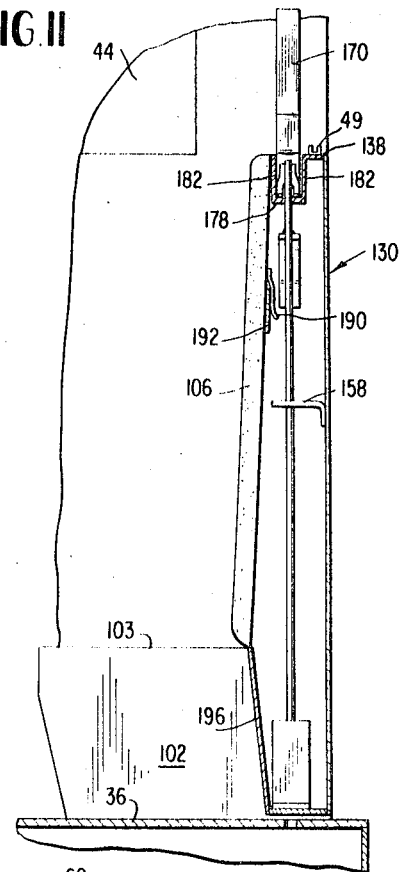
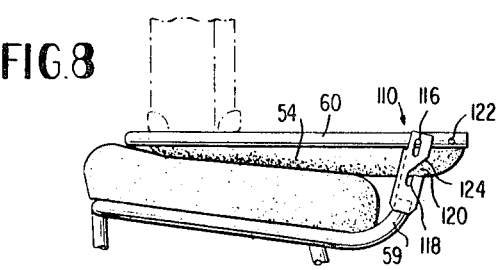
INVENTORS
THOMAS L. SHERBERT
TILLISON M. SHERBERT
BY
ATTORNEYS United States Patent Office 3,455,597
Patented July 15, 1969

3,455,597
PASSENGER VEHICLES
Thomas L. Sherbert, Lanham, Md., and Tillison M. Sherbert, Washington, D.C., assignors to D.C. Transit System, Inc., Washington, D.C., a corporation of the District of Columbia
Filed July 20, 1967, Ser. No. 654,865
Int. Cl. B60n 1/02, 1/08; A47c 3/02
U.S. Cl. 296—64                                      18 Claims

ABSTRACT OF THE DISCLOSURE

In a bus, an adjustable seating arrangement wherein each seat may be adjusted to face transversely or longitudinally of the bus. Adjustability of the seats is achieved through a threaded clamping member associated with each seat and cooperable with a threaded member fixed on the floor of the bus below the seat. In the back wall of the bus, a door is installed to enable large packages or other items to be brought into the bus. Moreover, the backrest associated with one or more of the seats is foldable in overlying relationship with the seat for purposes of resting parcels or packages thereon.

Summary of objects and invention

This invention relates to improvements in passenger vehicles such as buses. Additionally the invention pertains to novel seat and door structures particularly suitable for use in buses although not limited thereto.

It is a general object of this invention to improve the comfort, utility and versatility of passenger carrying vehicles such as buses. It is also an object to achieve the foregoing without appreciably increasing the overall space requirements of the vehicle.

A more specific object of the present invention is to provide in a bus or similar vehicle, an adjustable seating arrangement in which the seats may be individually positioned to face either transversely or longitudinally of the bus as may be desired. Included herein is the provision of a bus having such as an adjustable seating arrangement which also efficiently utilizes the space in the bus.

A further object of the present invention is to provide a novel mounting for a seat, enabling the latter to be quickly and easily adjusted into various angular positions and securely fixed therein against movement. Included herein is such a mounting which is particularly suitable for use with seats in a passenger vehicle such as a bus although not limited thereto. Moreover it is an object to provide such a novel mounting for a seat which may be incorporated into conventional buses and seats.

A further object of the present invention is to provide a novel mounting for a seat which is compact and durable and which may be concealed from view so as not to unduly encumber the associated seat or cause discomfort to its occupant.

Another object of the present invention is to provide in a bus, an improved door and surrounding structure for permitting entry into the bus of large packages, parcels or other items. Included herein is such a door having a novel latch which effectively holds the door in closed position and yet may be conveniently operated for purposes of releasing the door for opening.

A still further object of the present invention is the provision of such a rear door in a bus which may be employed with safety and without increasing the space requirements in the bus; nor adversely affecting the appearance of the bus or the comfort of its occupants.

Yet another object of the present invention is to provide in a passenger vehicle such as a bus, a novel provision for resting large packages or parcels without blocking the aisle in the bus or disturbing its occupants. More specifically it is an object to utilize the backrest of one or more of the seats in the bus that is may be folded into overlying relationship with the associated seat for supporting parcels or packages.

The above objects are achieved in a bus whose seats are mounted for adjustable movement between a position facing longitudinally of the bus and a position facing transversely of the bus. Preferably the seats are dimensioned and arranged such that when they face transversely of the bus their backrests will extend along the side walls of the bus. Additionally when in this position, the seats may extend continuously with their adjacent ends in abutting engagement so as to form a substantially continuous seat in effect. Each seat is individually adjustable apart from the other seats, and in the preferred embodiment, the adjustability is achieved by a threaded member such as a bolt projecting upwardly from the floor of the bus below the seat and a cooperable second threaded member, such as a nut but preferably a hand wheel, engageable on the bolt to secure the seat in adjusted position. Attached to each seat is a support member having an elongated slot which receives the upper portion of the bolt with the hand wheel engaged on the bolt above the support member. A pressure plate is provided between the hand wheel and the support member for purposes of load distribution while a thrust receiving tube is provided about the bolt below the support member. Access to the hand wheel for adjusting the seat is achieved by removing a seat cushion which overlies and normally conceals the hand wheel and bolt.

To permit entry of large packages, parcels and other items into the bus, a rear door is provided in the rear wall of the bus. For safety purposes, this door is offset towards the right hand side of the bus to swing clockwise towards the left side of the bus into open position resting against the left hand portion of the bus rear wall. In this manner, the door does not extend beyond the sides of the bus when in the open position. Sliding window panels are provided in the rar wall of the bus, and the window panel that is positioned above the rear door is slidably received in a channel fixed to the top surface of the rear door. The top edge of this window panel slides in a channel fixed in the upper portion of the rear wall of the bus, and thus it is necessary to open the window panel by sliding beyond one side of the rear door before the latter may be opened.

To secure the rear door in closed position a latch is provided including a slidable bolt mounted in the door for movement between a retracted position in the door and an extended position projecting from the side of the door to be received in an aperture in the adjacent jamb structure formed in the rear wall of the bus. A spring biases the bolt to the retracted position, and to extend the bolt for latching, a cam is provided to be engageable with the bolt to cam it into the extended position. Actuation of the cam is through an elongated actuator rod mounted for vertical reciprocable movement in the door with the cam being fixed thereto and the top portion of the rod having a pivoted handle. When the handle is pivoted in one direction, the rod is moved to space the cam from the bolt thus permitting the biasing spring to retract the bolt for opening the door. When the handle is released, a spring associated with the rod returns the rod to engage the cam against the bolt to thereby extend the bolt into latching position. To conceal the handle when the door is closed, the door is formed with a top compartment receiving the handle.

The interior panel of the bus overlying the rear door is provided with a clip or other suitable fastener which engages over a cross-piece fixed in the rear door on its interior side. To open the door this interior panel is first removed from the door, and assuming the window panel has been moved to open position beyond one side of the door, the compartment in the top of the door is opened and the latch handle pivoted to unlatch the door. The door may then be opened manually.

Once brought into the bus, large packages or parcels as well as other items may be rested on a platform formed by the backrase of one or more seats in the bus so as to be out of the path of travel through the bus and particularly removed from contact with the occupants in the bus. This feature is effected by mounting the backrest of one or more of the seats for movement between a normal upright position and a retracted generally horiozntal position overlying the seat portion for receiving packages, parcels, etc. In the preferred embodiment, the backrest is made movable as aforedescribed by means of coupling members interconnecting the opposite side frames of the backrest with the adjacent portions of the base frame of the seat. These coupling member have slots which receive pivots on the backrest frame to pivotally mount the latter between the mentioned positions. To lock the backrest in upright position, the couplings have second slots which receive a locking pin fixed on the backrest frame. To move the backrest into the retracted position, the backrest frame must first be pulled upwardly to disengage the locking pins from their slots whereupon the backrest may be easily pivoted downwardly into the retracted position.

Other objects and advantages will become apparent from the following more detailed description in conjunction with the attached drawings in which:

FIG. 3 is a fragmental, plan view of the bus generally similar to FIG. 1 but with the passenger seats arranged in a different position;

FIG. 4 is an enlarged, fragmental, cross-sectional view taken generally along lines 4—4 of FIG. 2 showing one of the passenger seats in the bus and its mounting;

FIG. 5 is a cross-sectional view taken generally along lines 5—5 of FIG. 4;

FIG. 6 is a fragmental, cross-sectional view taken generally along lines 6—6 of FIG. 2 showing a passenger seat and its mounting over a wheel case in the bus;

FIG. 7 is a fragmental, cross-sectional view taken generally along lines 7—7 of FIG. 6;

FIG. 8 is a fragmental, side view showing one of the seats in the bus with its backrest in retracted position for supporting packages and parcels, the latter being illustrated in phantom;

FIG. 8a is a side view of a coupling member shown in FIG. 8;

FIG. 9 is an enlarged, fragmental, cross-sectional view taken generally along lines 9—9 of FIG. 2 showing a rear wall portion of the bus;

FIG. 10 is an enlarged, fragmental, elevational view from the interior of the bus showing a door in the rear wall of the bus; and FIG. 11 is a fragmental, cross-sectional view taken generally along lines 11—11 of FIG. 10.

Detailed description

Figure 1:
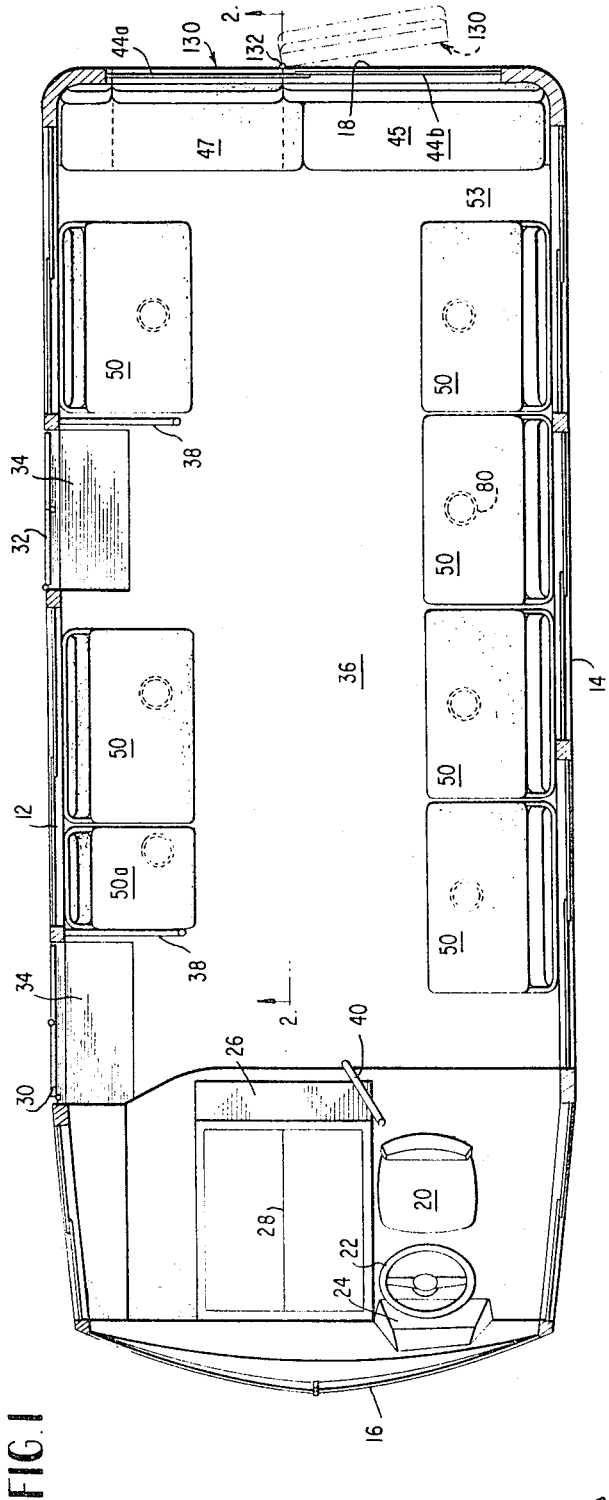
FIG. 1 is a plan view of the interior of a passenger vehicle such as a bus embodying the present invention.

Referring now to the drawings in detail, there is shown for purposes of illustration only, a bus generally designated 10 embodying the present invention. Bus 10 has a generally rectangular body and typically includes opposite side walls 12 and 14 extending longitudinally of the bus and opposite front and rear walls 16 and 18 extending transversely between the side walls with the front wall including a suitable windshield. In the front of the bus are the driver's seat 20, steering wheel 22 and dash 24 while on the adjacent right hand side, a case 26 houses the engine (not shown). Doors 28 swing upwardly from case 26 to provide access to the engine for purposes of maintenance or replacement.

Entrance into the bus is through a conventional folding door 30 in the right front side of the bus while exit is through a similar folding door 32 provided also in the right hand side but towards the rear of the bus. One or more steps 34 extend downwardly from the floor 36 of the bus at side doors 30, 32. As shown in FIG. 1 hand rails 38 are situated on the right hand side of doors 30, 32 while another hand rail 40 is provided behind the driver's seat. Side walls 12, 14 may have any suitable or conventional construction such as includes a lower non-transparent portion 42 formed from appropriate material and an upper portion formed by glass window panels 44 slidable in U-shaped channels attached in side walls 12, 14 to receive the upper and lower longitudinally extending edges of the window panels. Although not shown the bus may have any suitable roof.

In accordance with one aspect of the present invention, the passenger seats generally designated 50 are mounted to be adjustable between a position facing transversely of the bus as shown in FIG. 1 and a position facing longitudinally and forwardly of the bus as illustrated in FIG. 3. Seats 50 are dimensioned and arranged so that when in the position for example shown in FIG. 3 facing forwardly of the bus, sufficient leg room designated 51 is provided between adjacent seats. In the transversely facing position such as indicated in FIG. 1, seats 50 may be placed with their adjacent ends in abutting engagement to form in effect, a substantially continuous seating surface along the side of the bus. Sufficient space designated 53 is also provided between the rearmost seats 50 and backrests 45, 47 which extend transversely between sides 12, 14. In the shown embodiment, backrests 45, 47 which will be described subsequently in greater detail, are not made adjustable in the same sense as seats 50. Additionally in the specific embodiment shown, because of the interruption by side doors 30, 32 seats 50 on that side of the bus do not extend continuously in the same manner as the seats on the opposite side. Moreover one of the seats 50a is reduced in size in order to be accommodated in the space between side doors 30, 32.

Referring to FIGS. 3 to 6, the seats on the opposite sides of the bus each include a cushion seat portion 52 and a backrest portion 54 normally projecting upwardly in generally upright position. Cushion seat 52 is removably supported in a rectangular frame formed by tubular elements including opposite side and end elements 56, 58. Backrest 54 is supported on a generally U-shaped frame formed by tubular elements including opposite and parallel side elements 60 interconnected at their upper ends by a cross element 62 which also forms a hand rail. In the illustrated embodiment the backrest frame is formed integral with end elements 58 of the seat cushion frame. Support legs for the seat may be provided such as by the shown tubular members 64 which extend downwardly from the opposite ends of the seat cushion frame and include a cross-piece 66 that engages floor 36 of the bus.

In accordance with the invention, each seat 50 is provided with an individual mounting for securing it in a selected adjusted position. In the shown embodiment, each seat mounting includes an elongated support member formed by a pair of laterally spaced parallel bars 70 extending below the seat between its opposite ends. Bars 70 which may be formed from any suitable rigid material such as steel, are fixed in this position by a pair of steel hanger plates 72 having their upper ends respectively fixed to seat frame elements 58 and their lower ends fixed to the ends of bars 70 as shown in FIG. 5. Thus hanger plates 62 extend downwardly and inwardly at an acute angle to fix support bars 70 in a position generally parallel to the floor of the bus. The space 74 between support bars 70 forms an elongated slot or guideway dimensioned to receive an upstanding anchor member shown as a bolt 78 which is fixed in any suitable manner such as by welding to the bus floor below the seat. A cooperable threaded member preferably, a hand wheel 80 having clamping portion 82 with internal threads, is engaged on bolt 78 above support bars 70 so that upon advancing the hand wheel on the bolt, the seat may be secured. Preferably a pressure plate 84 shown as having a generally U-shaped cross-section is placed on support bars 70 to be engaged by clamping portion 82 of the hand wheel for purposes of pressure distribution. Pressure plate 84 is provided with an aperture (not shown) in its top wall for freely receiving bolt 78. To relieve the load on pressure bars 70 upon advancement of hand wheel 80 to secure the seat, a tubular bearing member 86 of any suitable material such as steel, is placed about bolt 78 with its upper end in engagement with pressure bars 70 and its opposite lower end grounded on bus floor 36.

Assuming the seat is secured in one position and it is desired to change its position, seat cushion 52 is first removed to expose hand wheel 80 which may then be rotated out of engagement with pressure plate 84 to loosen the seat relative to bolt 78. The seat may then be moved rectilinearly in a direction passing through the bolt and also rotated about the bolt into the desired position. Hand wheel 80 may then be advanced again to firmly engage pressure plate 84 to secure the seat relative to the bolt whereupon seat cushion 52 may be returned to its normal position. It will be seen that not only does the mounting permit the seat to be adjusted into different angular positions but also it allows the seat to be adjusted in rectilinear directions transversely or longitudinally of the bus. Thus although FIG. 1 shows the seats extending substantially continuously, it will be understood that they may be arranged with a greater spacing between their adjacent ends. Similarly the seats when facing forwardly of the bus may be spaced from the side walls 12, 14 towards the center of the bus in contrast to the arrangement shown in FIG. 3. Additionally, the seats may be adjusted to face rearwardly of the bus.

Referring to FIG. 6, there is shown one of the seats positioned over the rear wheel case 90 which projects upwardly from the floor of the bus; the rear wheel being designated 92 in the drawings. Because of wheel case 90, the seat mounting in this particular instance is somewhat modified so that bolt 78 is reduced in length and fixed to the top wall 94 of the wheel case. A rigid support plate 96 is fixed between seat frame elements 56 to overly a portion of the wheel case. As indicated in FIG. 7 an elongated slot 98 is provided in support plate 96 to secure or release the seat as may be desired. Because of the raised position of bolt 78 as required by wheel case 90, the underside of the seat cushion 52 is provided with a compartment 99 for accommodating the hand wheel as shown in FIG. 6. It will be noted that wheel case 90 is spaced from the adjacent side wall of the bus so that when facing longitudinally of the bus, the seat will straddle the wheel case. Slot 98 is made of sufficient length to allow the seat to be rotated without interference from the wheel case.

Figure 2:
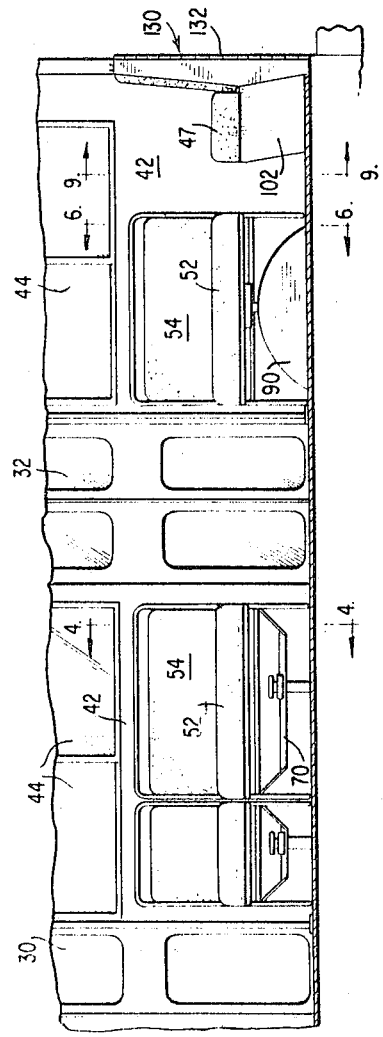
FIG. 2 is a fragmental, cross-sectional view taken generally along lines 2—2 of FIG. 1 showing a portion of the bus interior.

As described above, rear seats 45, 47 are not adjustable as seats 50, but rather are removably positioned on raised ledge structures 100 and 102 fixed across the rear of the bus as shown in FIGS. 2 and 9. Seats 45, 47 rest on the horizontal top surfaces 101, 103 of ledges 100, 102 and for reasons to be described later, ledges 100, 102 are spaced from each other by an opening 104 which underlies a portion of seat 47; the latter having its opposite ends supported on ledges 100, 102 as shown in FIG. 9. Rear panel 106 which forms the backrest associated with rear seat 47 is also removable as will be described subsequently.

In another feature of the present invention, one or more of the backrests 54 of seats 50 is made to be foldable from a normal, upright position into a retracted position overlying its associated cushion seat portion 52 in a generally horizontal plane as illustrated in FIG. 8. This position of the backrest may be employed to rest packages, articles, luggage and other items clear of the aisle in the bus and out of contact with the occupants. In the specific embodiment shown in FIGS. 8 and 8a, this feature is provided by forming the backrest frame 60, 62 separate from the seat frame portion 58, and coupling these frame portions together by a pair of coupling members generally designated 110. Each coupling member 110 may have a generally U-shaped body as shown, or a tubular body, defining an elongated axial passage one end of which receives the upwardly extending seat frame portions 59 to which the coupling member is suitably fixed in coaxial relation. As shown in FIG. 8a coupling member 110 has an elongated opening 112 extending longitudinally in its wall and a first pair of elongated slots 114 of much lesser length aligned in diametrically opposite portions of its wall on opposite sides of opening 112. Pivot pins 116 fixed to frame element 60 of the backrest are received through slots 114 to mount the backrest for pivotal movement between upright and retracted positions. In moving into and out of its opposite positions, the lower portion of the backrest frame element 60 passes through opening 112 in the coupling member.

To releaseably lock the backrest in the normal upright position against inadvertent movement, each coupling member is provided with a second pair of elongated slots 118 aligned below the first pair of slots 114. A wall portion of the coupling member is cut away to form recesses 120 communicating slots 118 with opening 112 in the side wall. Locking pins 122 are fixed on the backrest frame element 60 to be received first in recesses 120 and then into slots 118 upon movement of the backrest into upright position. Movement of backrest frame element 60 downwardly to seat locking pins 120 in slots 118 is facilitated by cam surfaces 124 formed in the coupling member along recesses 120. Upon pivoting the backrest into upright position, locking pins 122 will engage the cam surfaces and thereby will be cammed downwardly into slots 118. The backrest is thus locked against pivoting because of the engagement between locking pins 122 and the edges of the coupling members defining slots 118. To release the backrest for movement into the retracted position, it is necessary to merely pull the backrest upwardly to remove locking pins 112 from slots 118 and place them in recesses 120 whereupon the backrest may be easily pivoted about its pins 116 into the horizontal position as shown in FIG. 8. One or more articles such as indicated by 126 in FIG. 8 may then be supported on the backrest. Although only one coupling member has been described in detail above, it will be understood two coupling members are employed on the opposite sides of each backrest frame.

In order to permit entry of large packages, parcels and other items into the bus from the rear thereof to avoid interference and congestion at the entrance door 30 or in the aisle, rear wall 18 is provided with a door generally designated 130. Preferably and as show, door 130 is offset towards the right hand side of the bus, being suitably hinged at 132 for swinging movement clockwise between a closed position indicated in FIG. 10, and an open position wherein it engages the exterior surface of rear wall 18 with the free edge 134 of the door spaced inwardly from the left hand side of the bus. In the shown embodiment, door 130 has a hollow construction with a generally rectangular shape dimensioned to fit in snug fashion in its associated opening in rear wall 18 when in closed position. The exterior panel 136 of the door is formed from the same material as the paneling of rear wall 18 with which it is substantially flush and forms a substantially continuous surface when the door is closed as shown in FIGS. 1 and 2. Similarly, top edge 138 of the door terminates in the same plane as the top of the rear wall paneling as shown in FIG. 9.

Above door 130 and the rear wall paneling are windows 44a and 44b whose upper and lower edges are slidable in U-shape channels 49 fixed transversely in the upper portion (not shown) of rear wall 18 and on the top surfaces of the rear wall paneling and door as shown in FIGS. 9 and 11. A short channel piece 51 is provided in rear wall 18 just beyond the adjacent end channel 40 on the door, to receive the lower leading edge of window 44a in the fully closed position. Similarly a short channel piece (not shown) is provided in an upper portion of rear wall 18 to receive the upper leading edge of window 44a in the fully closed position. It will thus be seen that in order to open door 130, window 44a must be moved to the fully opened position entirely beyond the hinged side of the door.

For positively securing the door in its closed position against movement there is provided a latch mechanism which in the shown embodiment, includes a slide bolt 140 mounted for slidable movement in the door between a fully retracted position fully within the door as shown in FIG. 10 and an extended projected position beyond the free edge 134 of the door for reception into a corresponding aperture 142 formed in a vertical partition 144 fixed to rear wall 18 to form the jamb of the door. A U-shaped bracket having its legs 146 fixed to the interior side of the free edge of the door, may be employed to mount slide bolt 140 for the aforementioned movement. Slide bolt 140 passes through a sleeve 147 fixed about an aperture in the free edge of the door and an aligned aperture formed in the yoke piece, 48 of the bracket. A spring shown as a coil compression spring 150 biases slide bolt 140 into its retracted position. Spring 150 is received within the bracket about slide bolt 140 with one end bearing against the free edge 134 of the door and the other end bearing against a suitable member such as a collar 152 fixed to the slide bolt.

To extend the slide bolt for latching, an actuator mechanism is provided including a cam 154 fixed to an actuator rod 156 to be movable against the inner end of slide bolt 140 to cam the latter outwardly upon downward movement of actuator rod 156. Cam 154 may be formed by a flat member extending approximately 45° with respect to the bolt 140 and suitably fixed at an intermediate upper portion of rod 156 which extends vertically in the interior of the door between the top and bottom edges thereof. Mounting of actuator rod 156 may be accomplished in any suitable way such as by an L-shaped bracket 158 fixed to exterior panel 136 of the door and having an aperture receiving an intermediate portion of the actuator rod. The lower end of actuator rod 156 is mounted in a U-shaped bracket whose legs 160 are fixed to the bottom panel 162 of the door; the bracket having a yoke piece 164 apertured to receive the actuator rod.

Under normal conditions, actuator rod 156 is biased downwardly to maintain slide bolt 140 in its extended position through cam 154 bearing against the slide bolt. This biasing may be accomplished such as by a compression coil spring 166 shown in FIG. 10 as located within bracket 160 with one end bearing against yoke piece 164 and the opposite end bearing against a washer 166 fixed to actuator rod 156.

In order to raise actuator rod 156 to space cam 154 from the slide bolt and permit the associated spring 150 to retract the slide bolt for unlatching the door, rod 156 must be moved upwardly. In the preferred embodiment, this is accomplished through a handle 170 having a hooked end 172 the extremity of which is pivotally connected by pin 174 to the upper end of actuator rod 156 as shown in FIG. 10. A compartment 176 formed by a bottom wall 178 and opposite end walls 180 extending between side walls 182, is recessed in the upper surface of the door to receive handle 170 in its idle position where rod 156 is biased downwardly by spring 166. Bottom wall 178 of compartment 176 forms an abutment surface for engaging nose portion 172 of the handle upon counterclockwise movement of the handle from a horizontal position lying in the compartment to a generally vertical position, for raising the actuator rod against the bias of its associated spring 166. This will space cam 154 from slide bolt 140 and permit spring 150 to retract the latter.

After handle 170 is pivoted upwardly to raise rod 156 the latter may be maintained in its raised position by pivoting the handle beyond a position centered over the rod such as shown in FIG. 10. In this position, abutment surface 178 prevents the rod from pivoting back and also biasing spring 166 serves to impress an "overcenter bias" on the handle maintaining it in the raised position. When it is desired to latch the bolt in its aperture 142 in the jamb 144, handle 170 is merely pivoted clockwise beyond center whereupon spring 166 will quickly retract the actuator rod while also causing the handle to return within its compartment 176. To conceal the handle in the compartment, a suitable closure or flap such as 186 pivoted at 188 may be provided in the top of the door.

Rear interior panel 106 is removable from rear door 130 in order to provide access to the latch mechanism and its actuator rod. Preferably panel 106 is attached to the interior side of door 130 by means of a suitable clip or clips 190 fixed across the rear surface of panel 106 to be received over a crosspiece 192 (see FIG. 11) fixed across the door at the inner side thereof. Clip 190 may be easily disengaged from cross-piece 192 merely by lifting panel 106. The width of interior panel 106 generally corresponds to the width of the door. However, the lower edge of panel 106 terminates at the level of top surfaces 101, 103 of the ledges which support rear seats 45, 47. The space 104 below rear seat 47 and between ledges 100, 102 is closed by a rectangular panel 196 fixed across the lower interior side of door 130.

Assuming that door 130 is in the closed latched position and it is desired to open the same for use, window 44a must be slid completely to one side of the door, and rear seat 47 removed by lifting off ledges 100, 102. Compartment cover 186 is then opened and handle 170 pivoted to the position shown in FIG. 10 whereupon actuator rod 156 will be raised to space cam 154 from slide bolt 140 which will then be free to move inwardly out of aperture 142 in the jamb. Door 130 may then be opened manually and rested against the exterior surface of rear wall 18. To close the door, the above steps are reversed.

From the above description, it will be seen that the improvements of the present invention are highly practical in nature finding special utility in buses employed by shoppers in city areas. Moreover the improvements of the present invention may be incorporated into new or old buses without requiring substantial redesign or reconstruction. Furthermore the improvements may be implemented without substantial costs.

Modifications and adaptations of the present invention readily apparent from the foregoing description and associated drawings, although not specifically mentioned herein, will nevertheless be included within the scope of the present invention as indicated in the appended claims.

What is claimed is:

1. In a passenger vehicle having a floor and a number of seats located on the floor, means individually associated with each seat for selectively adjusting and securing the seat in any one of a number of positions, said means including a mounting member fixed to the seat in a generally horizontal plane and having an elongated slot thereing extending in a generally horizontal plane, an upright anchoring member attached at one end to the floor of the bus with its opposite upper end extending through said slot, said seat being rotatable about said anchoring member as well as rectilinearly movable in a horizontal plane along the floor of the vehicle relative to said anchoring member as permitted by said slot for purposes of adjusting the position of the seat, and fastening means releasably securing said mounting member to said anchoring member in adjusted position.

2. The passenger vehicle defined in claim 1 further including means fixing said anchoring member to said vehicle floor in vertical position against movement.

3. The passenger vehicle defined in claim 2 wherein said fastening means includes threads on the upper end of said anchoring member, and a cooperable threaded member engaged on the thread of the anchoring member above said slot to be engageable with a portion of said mounting member defining said slot upon advancement on the anchoring member.

4. The vehicle defined in claim 3 wherein said threaded member is a hand wheel and wherein said seats each include a frame, a seat portion removable from the frame and having a bottom recess for receiving said hand wheel, said seat portion being removable from said frame to provide access to said hand wheel for adjusting the position of the seat.

5. The passenger vehicle defined in claim 3 further including an elongated pressure plate overlying said slot and having an aperture receiving the upper end portion of said anchoring member with said threaded member being engageable on said pressure plate, and a thrust receiving tube located about said anchoring member with its upper end in engagement with said mounting member and its lower end in engagement with the floor of the vehicle.

6. In a passenger vehicle having a longitudinal direction extending forwardly and rearwardly of the bus and a transverse direction extending between opposite sides of the bus the improvement comprising in combination; a plurality of seats, and means individually associated with each seat for selectively adjusting and securing the seat in one of two positions facing either longitudinally or transversely of the vehicle, said means including a first member associated with the seat and a second member fixed with respect to a body portion of the vehicle below the seat to be cooperable with the first member for securing the seat in position, said first and second members being mutually engageable threaded members, said means further including a support member fixed with respect to said seat and having an elongated slot, one of said threaded members being received through said slot such that upon advancement of the threaded members relative to each other, the seat will be secured in position relative to the body portion of the vehicle, a pressure plate slidably mounted on said support member and having an aperture receiving said one of the threaded members with the other threaded member engageable on the top surface of the pressure plate, said one threaded member including an upstanding bolt passing through the elongated slot in said support member and through the aperture in said pressure plate, the other threaded member being a hand wheel having a threaded internal passage engaged on the bolt above the pressure plate, said support member being comprised of a pair of elongated rails extending under said seat in laterally spaced relationship to define said elongated slot.

7. In a passenger vehicle having a longitudinal direction extending forwardly and rearwardly of the bus and a transverse direction extending between opposite sides of the bus, the improvement comprising in combination; a plurality of seats, and means individually associated with each seat for selectively adjusting and securing the seat in one of two positions facing either longitudinally or transversely of the vehicle, said means including a first member associated with the seat and a second member fixed with respect to a body portion of the vehicle below the seat to be cooperable with the first member for securing the seat in position, said first and second members being mutually engageable threaded members, said means further including a support member fixed with respect to said seat and having an elongated slot, one of said threaded members being received through said slot such that upon advancement of the threaded members relative to each other the seat will be secured in position relative to the body portion of the vehicle, a pressure plate slidably mounted on said support member and having an aperture receiving said one of the threaded members with the other threaded member engageable on the top surface of the pressure plate, said one threaded member including an upstanding bolt passing through the elongated slot in said support member and through the aperture in said pressure plate, the other threaded member being a hand wheel having a threaded internal passage engaged on the bolt above the pressure plate, and a thrust receiving tube located about said bolt with the upper end in engagement with said support member.

8. In a passenger vehicle having a longitudinal direction extending forwardly and rearwardly of the bus and a transverse direction extending between opposite sides of the bus, the improvement comprising in combination; a plurality of seats, and means individually associated with each seat for selectively adjusting and securing the seat in one of two positions facing either longitudinally or transversely of the vehicle, said seats including a plurality of seats along one side of said vehicle dimensioned and arranged such that in the position facing longitudinally of the vehicle the seats will be spaced to provide leg room for the occupants of the seats and in the position facing transversely of the vehicle the seats will have their adjacent ends in substantial abutting engagement to provide in effect a continuous seat along said one side of the vehicle, the other side of the vehicle including a front door generally at the forward end of the vehicle and an intermediately positioned exit door, said seats including a plurality of seats on said other side located between said doors, said last recited seats being dimensioned and arranged such that when in the position facing longitudinally of the vehicle they will be spaced to provide leg room and when in the position facing transversely of the vehicle they will have their adjacent ends in substantial abutting engagement to, in effect, provide a continuous seat between said doors, said vehicle having a rear wall extending transversely between said opposite sides thereof, said rear wall having a rear door providing access into the vehicle from behind the vehicle, said rear door being offset toward said other side of the vehicle and being movable into open position towards said one side of the vehicle with the rear door engaging the external surface of said rear wall of the vehicle and the outer free edge of the rear door being spaced inwardly from said one side of the vehicle.

9. The combination defined in claim 8 wherein one of said seats located on said other side of the vehicle is located between the intermediately positioned door and said rear wall, said last recited seat having a backrest and means for folding the backrest between an upright position and a retracted position lying generally in a horizontal plane for supporting items thereon.

10. In combination with a seat, means for adjustably mounting and securing the seat in fixed position with respect to an underlying support surface comprising in combination; a support member fixed with respect to the seat and having an elongated slot extending generally in a horizontal plane, an upright anchoring member adapted to be fixed with respect to a support surface underlying the seat, said anchoring member having an upper portion received through said slot to permit the seat to be rotated about the anchoring member also moved rectilinearly relative to said anchoring member for fastening said support member and seat in fixed adjusted position relative to said anchoring member and the associated underlying support surface.

11. The structure defined in claim 10 wherein said seat includes peripheral frame members and a removable seat portion supported on said frame members in overlying relation to said support member, said support member being fixed with respect to said frame members such that upon removal of said seat portion from the frame members, said support member and fastening means will be exposed for access for purposes of adjusting the seat.

12. The structure defined in claim 11 wherein said seat portion has a bottom recess for receiving said fastening means when the seat portion is in place on said peripheral frame members.

13. The structure defined in claim 12 wherein said fastening means includes threads on the upper portion of said anchoring member and a hand wheel having internal threads engaged on the threads of said anchoring member such that upon advancement of the hand wheel on the threads of the anchoring member, the hand wheel will engage said support member to secure the seat relative to the anchoring member, and wherein said recess in said seat portion is dimensioned to receive the hand wheel when the seat portion is in position on the peripheral frame members.

14. The structure defined in claim 10 wherein said fastening means includes threads on the upper portion of said anchoring member, a threaded member engaged on the threads of said anchoring member, and a pressure plate having an aperture receiving the upper portion of said anchoring member with the pressure plate located between said support member and said threaded member such that upon advancement of the threaded member on the anchoring member, the threaded member will engage the pressure plate which in turn will firmly engage the support member to fix the seat in position relative to the anchoring member.

15. In combination with a seat, means for adjustably mounting and securing the seat in fixed position with respect to an underlying support surface comprising in combination; a support member fixed with respect to the seat and having an elongated slot, a first threaded securing member adapted to be fixed with respect to a support surface underlying the seat, a second threaded securing member associated with the seat to be cooperable with said first securing member to secure the seat in position, one of said threaded members being receivable through said elongated slot in said support member, said first threaded member being a bolt and adapted to extend through said slot in said support member, said second threaded member including an internal threaded passage received on said bolt above said support member, a pressure plate slidable on said support member and having an aperture above said elongated slot receiving said bolt, said second threaded member being engageable on said pressure plate upon advancement on said bolt, and a load bearing tubular member located about said bolt below support member with its upper end bearing against the support member to receive the load upon advancement of said second threaded member on said bolt.

16. The structure defined in claim 15 wherein said second threaded member includes a hand wheel for rotating said second threaded member on said bolt.

17. In combination with a seat, means for adjustably mounting and securing the seat in fixed position with respect to an underlying support surface comprising in combination; a support member fixed with respect to the seat and having an elongated slot, a first threaded securing member adapted to be fixed with respect to a support surface underlying the seat, a second threaded securing member associated with the seat to be cooperable with said first securing member to secure the seat in position, one of said threaded members being receivable through said elongated slot in said support member, said seat including elongated peripheral frame members positioned generally in a horizontal plane and a removable seat cushion supported on said frame members, said support member being fixed with respect to said frame members to be exposed for access upon removal of the seat cushion, and said support member being formed by two rigid elongated members extending parallel between opposite sides of the seat to define said slot, and means fixing said elongated support members with respect to opposite sides of said frame portions and in generally horizontal plane below the frame portions.

18. In combination with a seat, means for adjustably mounting and securing the seat in fixed position with respect to an underlying support surface comprising in combination; a support member fixed with respect to the seat and having an elongated slot, a first threaded securing member adapted to be fixed with respect to the support surface underlying the seat, a second threaded securing member associated with the seat to be cooperable with said first securing member to secure the seat in position, one of said threaded members being receivable through said elongated slot in said support member, said seat including elongated peripheral frame members positioned generally in a horizontal plane and a removable seat cushion supported on said frame members, said support member being fixed with respect to the frame members to be exposed for access upon removal of the seat cushion, said seat cushion having a recess formed in its underside to receive and accommodate said threaded member.

References Cited

UNITED STATES PATENTS

| 753,545 | 3/1904 | Chamberlin. |
| 882,653 | 3/1908 | Scullin et al. _____ 297—240 |
| 1,333,338 | 3/1920 | Polson _____ 296—65 |
| 1,780,277 | 11/1930 | Seeley et al. _____ 248—119 X |
| 2,502,320 | 3/1950 | Guernsey _____ 296—28.1 |

FOREIGN PATENTS

| 1,012,057 | 4/1952 | France. |
| 12,300 | 12/1911 | Great Britain. |
| 333,745 | 8/1930 | Great Britain. |

RICHARD J. JOHNSON, Primary Examiner

J. A. PEKAR, Assistant Examiner

U.S. Cl. X.R.

248—425; 297—233, 240